United States Patent

[11] 3,576,146

[72] Inventor Robert E. Adams
 Hudson, N.Y.
[21] Appl. No. 794,648
[22] Filed Jan. 28, 1969
[45] Patented Apr. 27, 1971
[73] Assignee Gifford-Wood, Inc.
 Hudson, N.Y.

[54] MACHINE FOR CUTTING ICE BLOCKS
 8 Claims, 3 Drawing Figs.

[52] U.S. Cl. .................................................. 83/408,
 83/409, 83/437, 125/13, 143/38.1
[51] Int. Cl. ..................................................... B26d 7/06,
 B28d 1/04, B28d 1/08
[50] Field of Search .......................................... 143/38.1;
 83/408, 409, 437, 201.01; 125/13, 21

[56] References Cited
 UNITED STATES PATENTS
1,866,883 7/1932 Everett ........................ 125/13
2,113,631 4/1938 Smith ............................. 143/38.1
2,299,261 10/1942 Turner et al. .................. 143/38.1
2,925,104 2/1960 Allemann ....................... 143/1
3,285,301 11/1966 McManema ................... 143/1

Primary Examiner—Andrew R. Juhasz
Assistant Examiner—Leon Gilden
Attorney—Morse, Altman & Oates ABSTRACT: Apparatus is provided for cutting a large cake of ice into smaller blocks on an automatic basis. Hoisting mechanism raises and lowers a gig which carries the large cake of ice upwardly and downwardly into the path of cooperating cutting elements. A pair of spaced rotary disc saws cuts slots in one face of the cake and a chain saw cuts perpendicularly through another face of the cake, severing the small blocks from the main cake. Guide elements are employed to maintain the cake in position during the cutting operations.

INVENTOR
ROBERT E. ADAMS
BY
Morse, Altman & Oates
ATTORNEYS

INVENTOR
ROBERT E. ADAMS

MACHINE FOR CUTTING ICE BLOCKS

BACKGROUND OF THE INVENTION

1. Field of the Invention

This invention relates generally to machines for cutting ice blocks and more particularly is directed towards an automatic machine adapted to cut large cakes of ice into smaller blocks of uniform size and weight.

2. History of the Prior Art

In the ice industry, the practice has been to freeze water in cans to form a cake, typically 11×22×42 inches, known as a 300 pound cake of ice. In a few instances the cake will be 11×22×56 inches in dimensions and is referred as a 400 pound cake.

The large cakes are further processed by cutting them into smaller useable pieces. Ice cubes approximately 1¼ inches on the side are made by placing the large cake into a machine equipped with a bank of circular saws and then sawing the cake into small cubes. Larger blocks such as 25 pound pieces are made by placing the cake into a scoring machine which scores the ice with circular saws to a depth of approximately 1 inch and then breaking the cake into blocks by chipping along the score lines with an ice pick.

In recent years there has developed a steadily rising demand for ice blocks on the order of 10 lbs. in weight of a size appropriate for camper ice chests and the like. A suitable size is approximately 5×7×11 inches and to produce such a 10 lb. block the practice heretofore has been to hand-cut the 25 lb. block in half on a bandsaw. This approach is both slow and expensive and it is an object of the present invention to provide a low cost and efficient automatic machine for cutting large ice cakes such as 300 or 400 lb. cakes, for example, into smaller size blocks typically on the order of 10 lb. or so.

SUMMARY OF THE INVENTION

This invention features a machine for automatically cutting large cakes of ice into smaller blocks, comprising a frame having a carriage mounted for reciprocation upwardly and downwardly and adapted to carry a cake of ice into cutting engagement first with a pair of spaced rotary saws which form deep slots in one face of the cake and then against a chain saw perpendicular to the circular saws which cuts through another face of the cake to separate the smaller blocks from the main cake. Guide baffles are provided in proximity with the cutting elements to maintain the cake in position during the cutting operations.

DESCRIPTION OF THE PREFERRED EMBODIMENT

Figure 1:
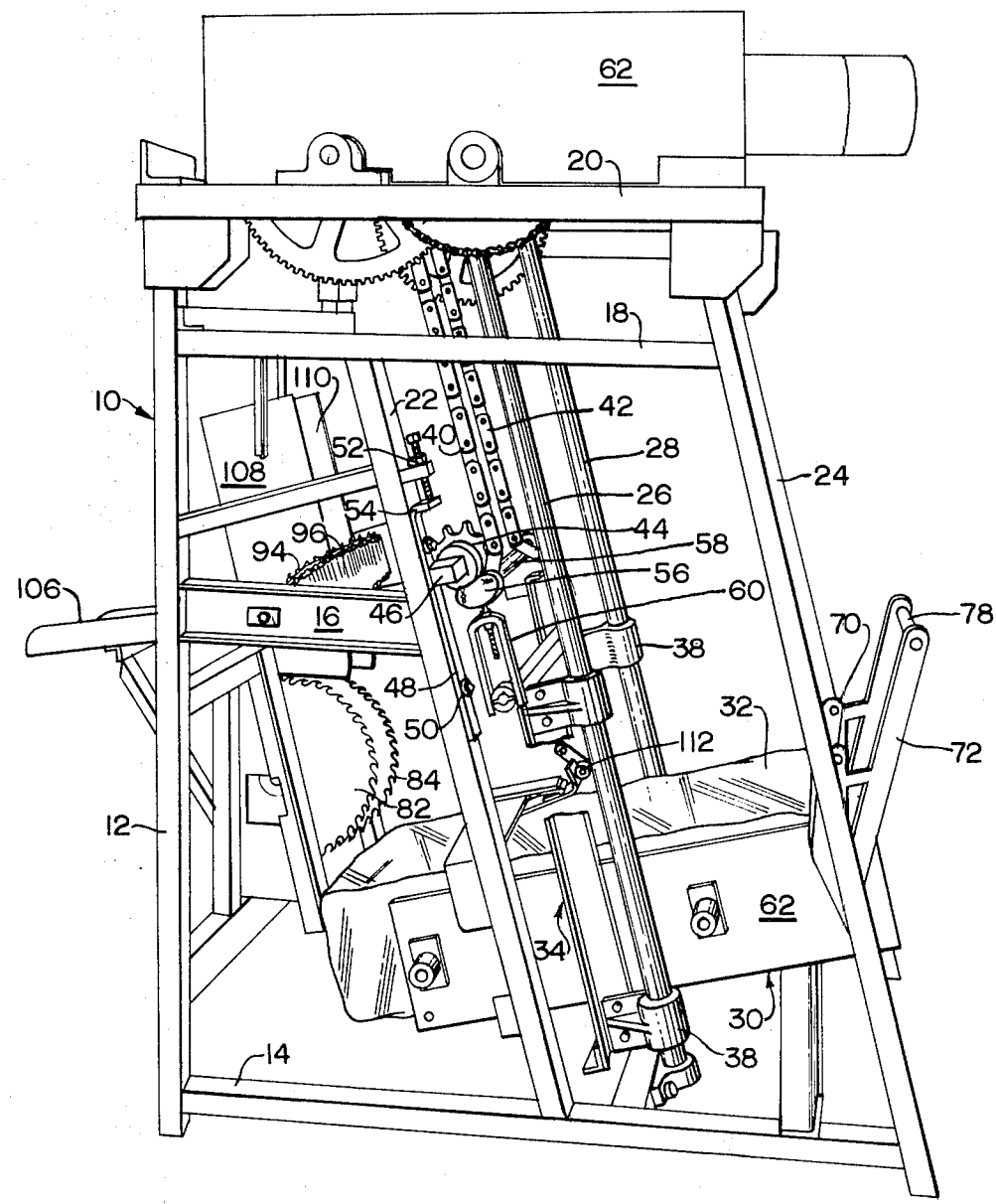
FIG. 1 is a view in perspective of an ice-block-cutting machine made according to the invention.

Referring now to the drawings, the reference character 10 generally indicates a rigid frame comprised of upright members 12, horizontal members 14, 16, 18 and 20 and inclined members 22 and 24. Secured to the frame parallel to the inclined frame members 22, is a pair of spaced parallel guide rods 26 and 28 extending from the base to the top of the frame. The rods 26 and 28 serve as a guideway for a gig or carriage 30 which holds a large cake of ice 32, typically 300 or 400 lbs. in weight. The carriage is connected to the rods 26 and 28 by means of an open rectangular slide bracket 34 having side members 36 welded or otherwise secured to the sides of the gig and provided with slide bushings 38 engaging the rods 26 and 28.

The bracket 34 is adapted to be reciprocated along the inclined guideway by means of motor-driven endless chains 40 and 42 located in the upper portion of the frame. The lower portions of the chains are looped over sprockets 44, rotatably mounted to the inclined frame members 22. Each sprocket mount includes a bushing or bearing 46 mounted on a slotted plate 48 and secured by bolts 50 to the frame member 22. A screw adjust device 52 is mounted to the frame 22 and drivingly engages an upturned end 54 of the plate 48 whereby the tension of the chains 40 and 42 may be adjusted. Connected to the chains are followers 56 which are joined to one another by a crossbar 58. Suspended from the crossbar 58 is a pair of turnbuckles 60, the lower ends of which engage the top of the bracket 34 whereby, when the chains are actuated, the bracket together with the gig and the cake of ice will be carried upwardly along the inclined path to a raised position and, upon reversal, the gig and ice will be lowered into the position shown in FIG. 1. The drive mechanism for the chains is located at the top of the frame 10 and generally enclosed by a housing 62.

Figure 2:
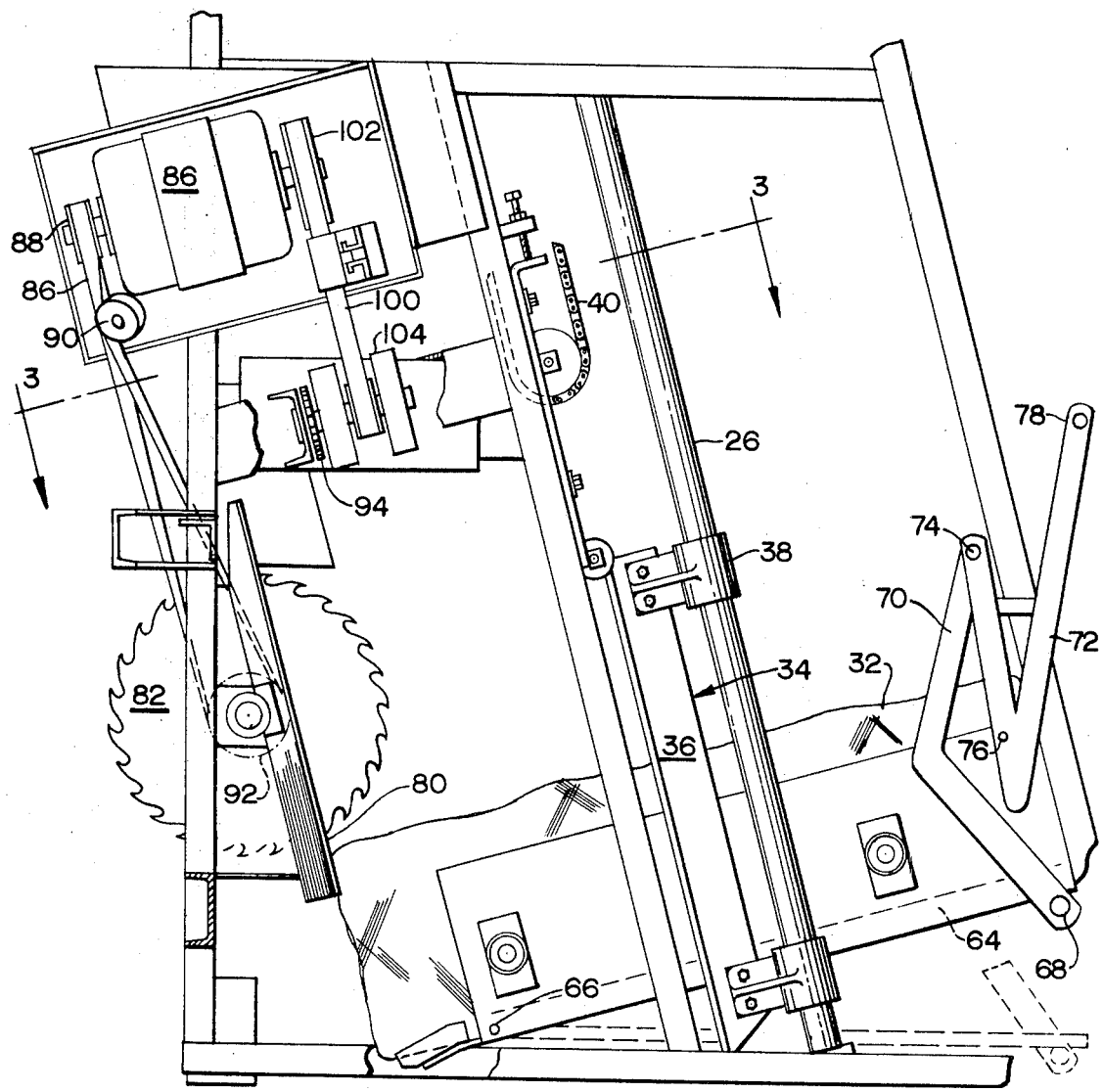
FIG. 2 is a sectional view in side elevation showing the carriage and cutting elements.
Figure 3:
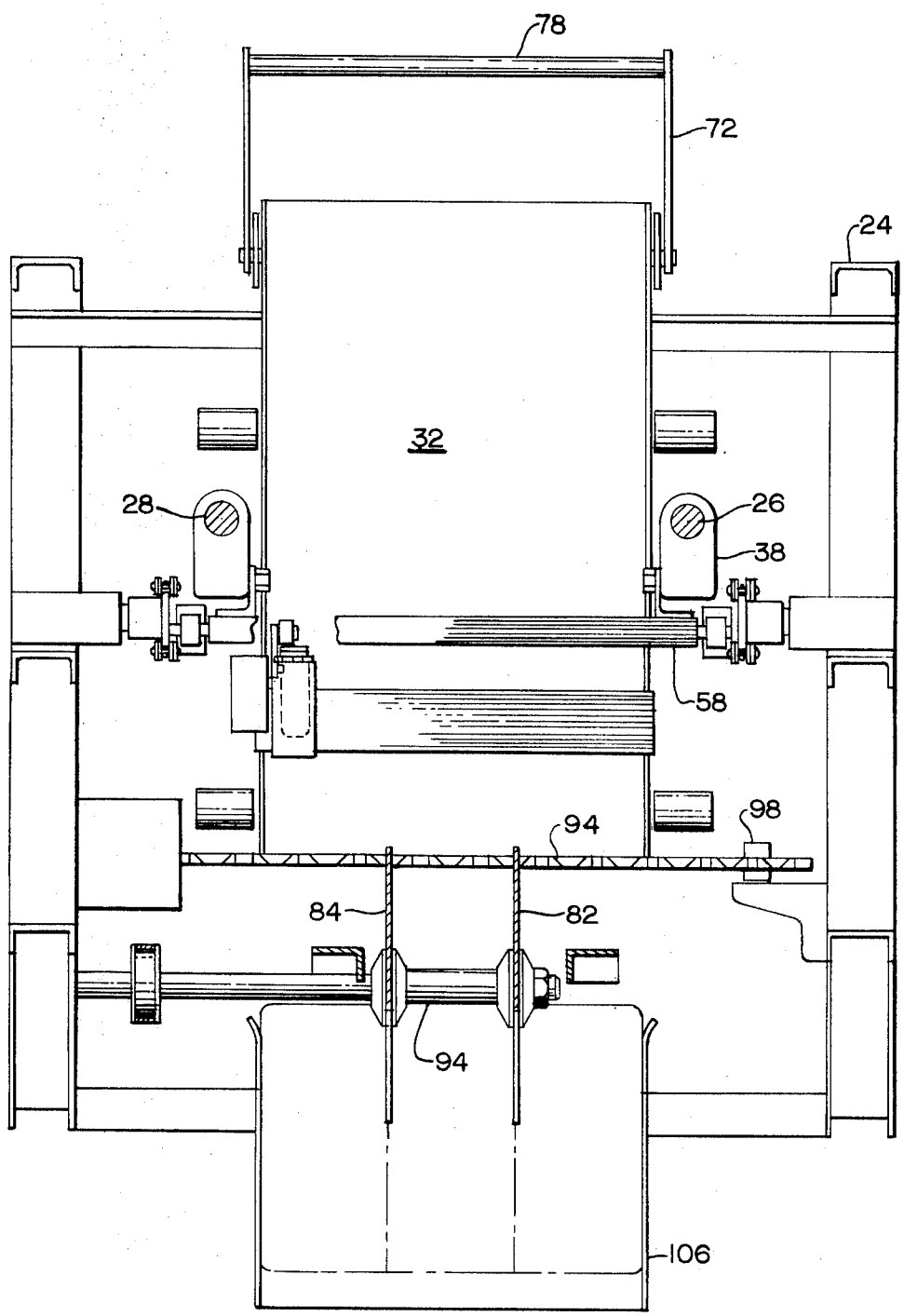
FIG. 3 is a cross-sectional view taken along the lines 3—3 of FIG. 2.

The gig, in front elevation, is a generally U-shaped affair open at the top and both front and rear. The gig is provided with upright sidewalls 62 and a hinged floor 64 which may be provided with longitudinal ribs to facilitate sliding movement of the ice cake 32. The floor 64 is hinged to the sidewalls 62 at the rear of the gig by means of a pivot 66 or the like. The forward end of the floor 64 is supported by a movable crossbar 68 extending under the lower forward edge of the gig and connected to the lower end of a crank arm 70 the upper end of which is connected to a V-shaped lever 72 by means of a pivot 74. The lever 72 is pivotally connected to the sidewall of the gig at pivot 76 and a cross handle 78 joins a matching lever and crank arm assembly on the opposite side for operation thereof. By pressing the handle 78 to the left, as viewed in FIG. 2, the lever arm 72 will pivot counterclockwise about pivot 76 causing the crank arm 70 to drop the floor 64 from the inclined position, shown in full line in FIG. 2, to the lowered or substantially horizontal position shown in broken line in FIG. 2. With the floor in the lowered position shown in broken line, a cake of ice 32 may be readily slid onto the floor of the carriage and, once in position, the handle 78 is pulled to the right thereby raising the floor to its normal operating position, this in turn causing the ice cake 32 to slide to its extreme left-hand position and butt against inclined guide plates 80 at the rear of the machine.

The guide plates 80 extend parallel to the rods 26 and 28 and are located on either side of a pair of spaced rotary disc cutters 82 and 84 mounted on the rear of the frame 10 and driven by means of a motor 86 through a belt and pulleys 86, 88, 90 and 92. The cutters are mounted on a horizontal arbor 94 and when the gig 30 is elevated the cutters slice through the rear or left-hand end of the cake 32 forming deep grooves from top to bottom of the left-hand end of the cake. Typically, the two vertical slots formed by the cutters are 5 inches deep. The guide plates extending above and below the cutters serve to maintain the blocks in proper position during this stage of the cutting operation.

As the gig continues to move upwardly it carries the cake past the disc cutters and into the bite of a transverse chain saw 94 looped over an elliptical center guide 96. One end of the guide 96 is mounted by a bearing 98 to the frame 10. The opposite end is driven by the motor 86 through a belt 100 and pulleys 102 and 104. It will be noted in FIG. 2 that the chain saw 94 is located in a plane tangential to the rotary cutters os that as the ice cake is moved upwardly it will cut down through the top of the cake intersecting the inner ends of the slots made by the rotary cutters. When the transverse cut is completed three blocks of ice, typically measuring approximately 5×7×11 inches, are produced. These three blocks being cut away from the cake 32 thereupon slide down an inclined chute 106 extending out from the rear of the machine.

It will be noted that a pair of flat spaced and parallel guides 108 and 110 are mounted vertically above and coplanar with the rotary cutters and are in close proximity to both of the cutters and to the chain saw, the leading right-hand edges of the guides extending generally along the tangential line between the disc cutters and the chain saw. The function of the two guides is to prevent the cake 32 from sliding forwardly into the chain saw once the cake has been carried clear of the lower guide plated and also after the cake has been fully cut through by the chain saw.

When the gig is carried into its uppermost position it automatically descends and when the gig reaches the bottom of its stroke the ice cake is clear of the guide 108 and 110. The remaining portion of the cake is free to slide downwardly under its own weight to the left against the guide plates 80. The ice cake therefore slides forwardly into cutting position and the gig again proceeds upwardly to repeat the operation automatically. When the ice cake has been fully cut up and the gig is empty, a tripper 112 on the gig swings down and trips a limit switch signalling that the gig is empty. A cam 56 on the elevator chain also trips a limit switch at the bottom of its stroke and when both switches are tripped the gig will stop at the bottom or loading position and the saws will stop. On reloading the gig with another ice cake, a start button is depressed and the cycle repeats.

I claim:

1. A machine for cutting small blocks of ice for a large cake of ice comprising:
   a. a fixed frame;
   b. a carriage reciprocatingly mounted to said frame for travel along an inclined vertical path, said carriage adapted for slidable reception of said cake, said carriage supporting said cake in an inclined position whereby said cake will tend to slide in a direction perpendicular to said path;
   c. means operatively connected to said carriage for reciprocating said carriage along said path in a first and second direction;
   d. stop means mounted to said frame for limiting the sliding movement of said cake in said carriage;
   e. first cutting means mounted to said frame for cutting at least one slot in one face of said cake as said carriage travels in said first direction;
   f. second cutting means mounted to said frame in spaced perpendicular relation to said first cutting means for cutting through an adjacent face of said cake and intersecting said slot as said carriage continues to travel in said first direction; and
   g. guide means mounted to said frame coplanar with said first cutting means, one edge of said guide means extending generally along the tangential line between said first and second cutting means, said guide means slidably received in said slot, said guide means engaging said cake at the inner end of said slot, said guide means positioning said cake in spaced relation to said second cutting means as said carriage travels in said first and second directions.

2. A machine according to claim 7 wherein said carriage includes an ice support portion movable from an inclined position to a substantially horizontal position.

3. A machine according to claim 2 wherein said ice supporting portion includes:
   a. floor means having forward and rearward portions, said floor means adapted for slidable reception of said cake, said forward portion hinged to said carriage;
   b. crank arm means having one of its ends pivotably connected to said rearward portion; and
   c. lever means pivotably connected to the other end of said crank arm means and pivotably connected to said carriage to a rearward portion thereof, said floor being moved from said inclined position to said horizontal position and from said horizontal position to said inclined position by movement of said lever means.

4. A machine according to claim 1 wherein said first cutting means includes a pair of parallel rotary saws, each rotary saw cutting one slot in the same face of said cake cake as said carriage moves in said first direction.

5. A machine according to claim 4 wherein said guide means includes first and second plates, said first plate mounted vertically above and coplanar with said one rotary saw, said second plate mounted vertically above and coplanar with said other rotary saw, said first and second plates in spaced parallel relation and in close proximity to both of said rotary saws and said second cutting means, said first plate being slidably received in said one slot and engaging said cake at the inner end of said one slot, said second plate being slidably received in said other slot and engaging said cake at the inner end of said other slot, said first and second plates positioning said cake in spaced relation to said second cutting means as said carriage travels in said first and second directions.

6. A machine according to claim 7 wherein said second cutting means includes a chain saw.

7. A machine for cutting small blocks of ice from a large cake of ice comprising:
   a. a fixed frame;
   b. a carriage reciprocatingly mounted to said frame for travel along an inclined vertical path, said carriage adapted for slidable reception of said cake;
   c. means operatively connected to said carriage for reciprocating said carriage along said path in a first and second direction;
   d. floor means movable from an inclined position to a substantially horizontal position, said floor means having forward and rearward portions, said floor adapted for slidable reception of said cake and support of said cake in an inclined position whereby said cake will tend to slide in a direction perpendicular to said path;
   e. crank arm means having one of its ends pivotably connected to said rearward portion;
   f. lever means pivotably connected to the other end of said crank and pivotably connected to said carriage at a rearward portion thereof, said floor being moved from said inclined position to said horizontal position and from said horizontal position to said inclined position by movement of said lever means;
   g. stop means mounted to said frame for limiting the sliding movement of said cake in said carriage;
   h. at least two rotary saws mounted to said frame for cutting a first and second slot in a common face of said cake as said carriage travels along said path in said first direction, said rotary saws being in spaced parallel relation;
   i. chain saw means mounted to said frame in space perpendicular relation to said rotary saws for cutting through an adjacent face of said cake and intersecting said slots as said carriage continues to travel in said first direction;
   j. guide means mounted to said frame, said guide means having first and second plates, said first plate mounted vertically above and coplanar with one of said rotary saws, said second plate mounted vertically above and coplanar with said other rotary saw, said first and second plates in spaced parallel relation and in proximity to both of said rotary saws and said chain saw means, said first plate being slidably received in said one slot and engaging said cake at the inner end of said one slot, said second plate being slidably received in said other slot and engaging said cake at the inner end of said other slot, said first and second plates positioning said cake in spaced relation to said chain saw means as said carriage travels in said first and second directions.

8. A machine according to claim 7 including:
   a. tripper means operatively connected to said carriage and adapted for engagement with said cake in said carriage; and
   b. first limit switch means operatively connected to said tripper means for generating a signal when said carriage is empty.

UNITED STATES PATENT OFFICE
CERTIFICATE OF CORRECTION

Patent No. 3,576,146         Dated April 27, 1971

Inventor(s) Robert E. Adams

It is certified that error appears in the above-identified patent and that said Letters Patent are hereby corrected as shown below:

Claim 2, column 3, line 53, change "7" to --1--

Claim 6, column 4, line 15, change "7" to --1--

Claim 2 should read:

> 2. A machine according to claim 1 wherein said carriage includes an ice support portion movable from an inclined position to a substantially horizontal position.

Claim 6 should read:

> 6. A machine according to claim 1 wherein said second cutting means includes a chain saw.

Signed and sealed this 30th day of May 1972.

(SEAL)
Attest:

EDWARD M. FLETCHER, JR.　　　　ROBERT GOTTSCHALK
Attesting Officer　　　　　　　　Commissioner of Patents

FORM PO-1050 (10-69)